Patented June 17, 1924.

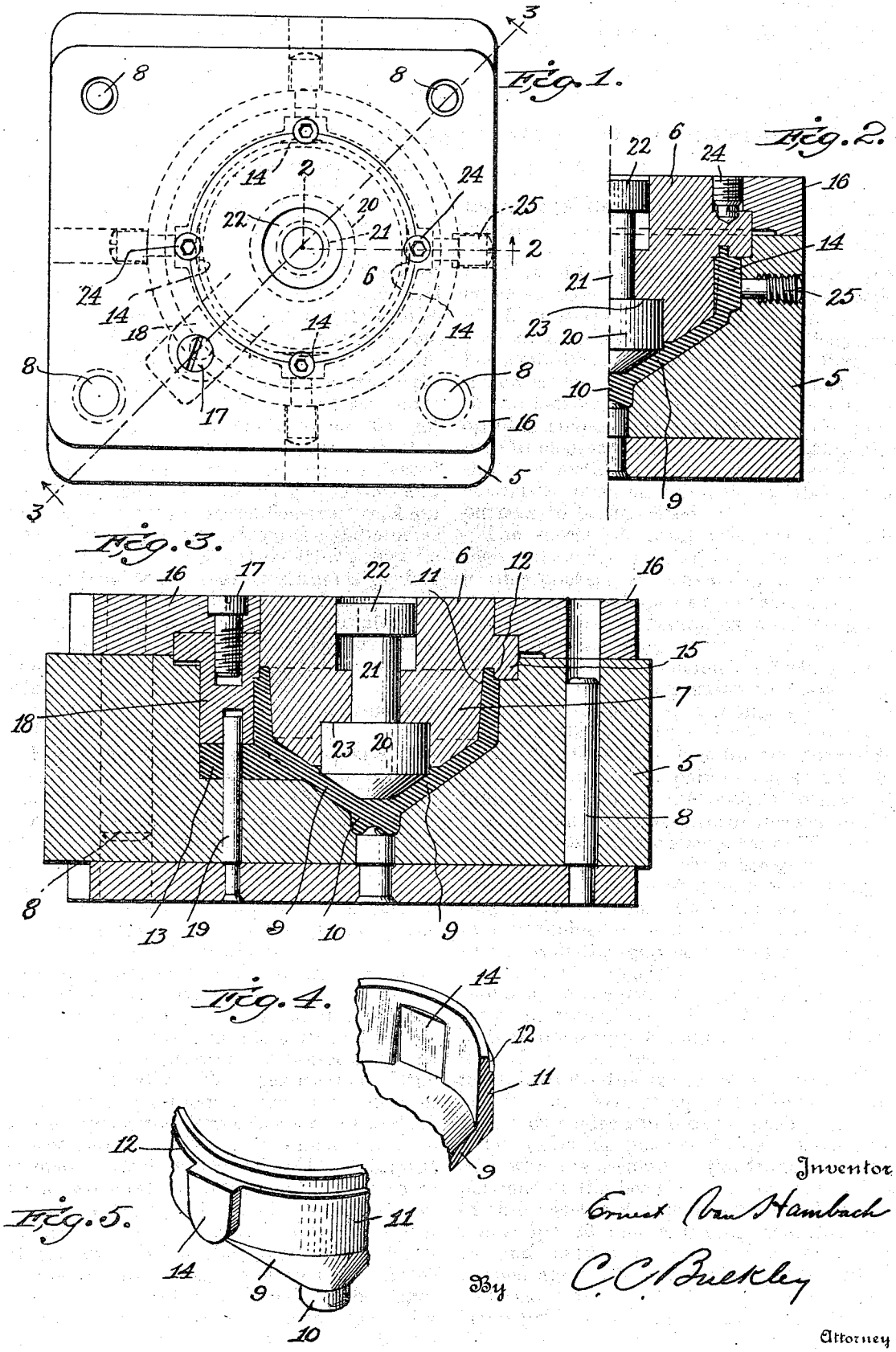

1,498,335

UNITED STATES PATENT OFFICE.

ERNEST VON HAMBACH, OF CHICAGO, ILLINOIS, ASSIGNOR TO HERBERT D. LAFFERTY, OF CHICAGO, ILLINOIS.

MOLD FOR MAKING ARTICLES FROM PLASTIC SUBSTANCES.

Application filed April 28, 1923. Serial No. 635,363.

*To all whom it may concern:*

Be it known that I, ERNEST VON HAMBACH, a citizen of the United States of America, and a resident of Chicago, county of Cook and State of Illinois, have invented certain new and useful Improvements in Molds for Making Articles from Plastic Substances, of which the following is a full and clear specification.

The object of this invention is to provide a simple and effective apparatus for molding the conical shells adapted for use as timer-casings for automobile ignition systems. These casings are preferably made of bakelite, but they may be made of other insulating material capable of being molded. The particular form of casing my apparatus is adapted to make is specifically illustrated in my co-pending application Serial No. 456,461, filed March 28, 1921, Patent 1,484,556, Feb. 19, 1924.

In the drawing—

Fig. 1 is a plan view of my improved mold;

Fig. 2 is a half transverse section on the line 2—2 of Fig. 1;

Fig. 3 is a diagonal section on the line 3—3 of Fig. 1;

Figs. 4 and 5 are detail fragmentary views of a portion of the shell or casing that my mold is adapted to form.

Referring to the drawing annexed by reference characters, 5 indicates the base or flask member which is preferably of steel and has cut in its upper side a substantial conical depression to conform to the exterior contour of the timer-shell. The cope member 6 is adapted to fit down upon the upper face of the flask member and is provided with a conical core 7 adapted to enter the conical cavity in the flask to form with the walls of the conical cavity the molding-chamber. The two members 5 and 6 are guided accurately on each other by means of suitable guide-pins 8.

The molding-chamber is shaped to form a shell of generally conical shape. This shell consists of a closed conical end-wall 9, a central exterior projection 10, a rim-portion 11 which is provided with a rabbet 12, a radial exterior arm 13. and four thickened parts 14 around the rim 11, whose inner and outer faces are flat and parallel with a line drawn through the center of the cone. The remainder of the inner surface of the rim-portion 11 inclines outwardly toward the outer edge of the rim, as shown more particularly in Fig. 3. The radial arm 13 is provided with a hole which is parallel to the axis of the shell.

The cope member consists, as aforesaid, of a central core 7, which is provided with an overhanging flange 15 adapted to rest on the cope around the edge of the cavity, and an outer ring-member 16 adapted to rest upon the top surface of the cope and overlie the adjacent edge of the core member. At the side where the radial arm 13 is formed, I fasten to the under side of the ring-member 16, by means of a screw 17, a depending block 18 which forms a part of the molding-chamber proper and whose lower end forms the top-wall of the lateral chamber which forms the radial arm 13. To form the hole in this radial arm, I provide the flask with an upstanding pin 19 which is adapted to enter a hole in the aforesaid block 18. In the center of the core member I mount a knockout-plunger consisting of a head 20 having a conical end-surface adapted to form part of the upper wall of the molding-cavity, a stem 21 and an anvil-head 22, the latter being arranged to work in a cavity in the upper side of the cope. This plunger is capable of limited sliding movement within the cope.

In the use of my mold, the bakelite or other insulating material is placed in the molding-cavity in the form of powder or in a plastic state, care being taken to deposit approximately the right amount of material for a single article. The cope is then placed in position and the mold is then subjected to the necessary pressure and high heat. The pressure forces the plunger upwardly into the core-member until the upper side of the head 20 abuts against the annular shoulder 23 in the core, the material in the cavity serving to force this plunger up hard against said shoulder. After the mold has cooled off and the molded shell has become hard, the parts of the flask of the mold are separated. The flask member comes away from the shell article easily, as the outer surfaces of the article are more or less conical and, besides, there is a shrinking action which frees the flask from the article. The shell is then knocked off from the core by one or more sharp taps on the anvil-head 22, which serves to drive the plunger 20 against the central part of the shell and thus forces it off the core 7. When the shell shrinks in cooling, it tightly grasps the core and this grasping action is greatly augmented by the fact that the inner faces of the thickened portions 14 are straight with regard to the axis of the shell. This clamping action due to shrinking is so great that I have especially designed my plunger so as to get a broad bearing on the shell. To get this broad bearing, I provide the plunger, as stated, with an enlarged head and make its exterior surface a part of the upper wall of the molding-chamber. With this form of plunger, I have found that, notwithstanding the great clamping action caused by the shrinking, I can readily knock off the shell without fracturing the same.

The screws 24 are employed for fastening the ring 16 to the core member 6; and the screws 25 are mere filling plugs used to fill up holes made in the flask for convenience in milling out the cavities made in the molds for forming the enlargements 14.

What I claim is:

1. An apparatus for molding conical plastic shells of insulating material having interior flat faces parallel to the axis of the shell, embodying a flask member having a conical cavity, a cope member having a conical core, and a knock-off plunger mounted in the core and having an anvil-head at one end and having its outer end exposed to receive the blows of a hammer and its inner end provided with an enlarged conical head fitting up in a cavity in the core.

2. In a mold of the class set forth, a flask provided with a conical cavity and a lateral cavity for forming the lateral arm of the article to be molded, a cope member embodying a conical core, a central knock-off-plunger, and a ring adapted to rest upon the flask member and provided with a depending block 18, for the purpose set forth.

Signed by me at Chicago, Illinois, this 25 day of April, 1923.

ERNEST VON HAMBACH.